June 27, 1939.    H. M. GUINOT    2,164,240
MANUFACTURE OF CHLOROHYDRINS
Filed Feb. 26, 1936
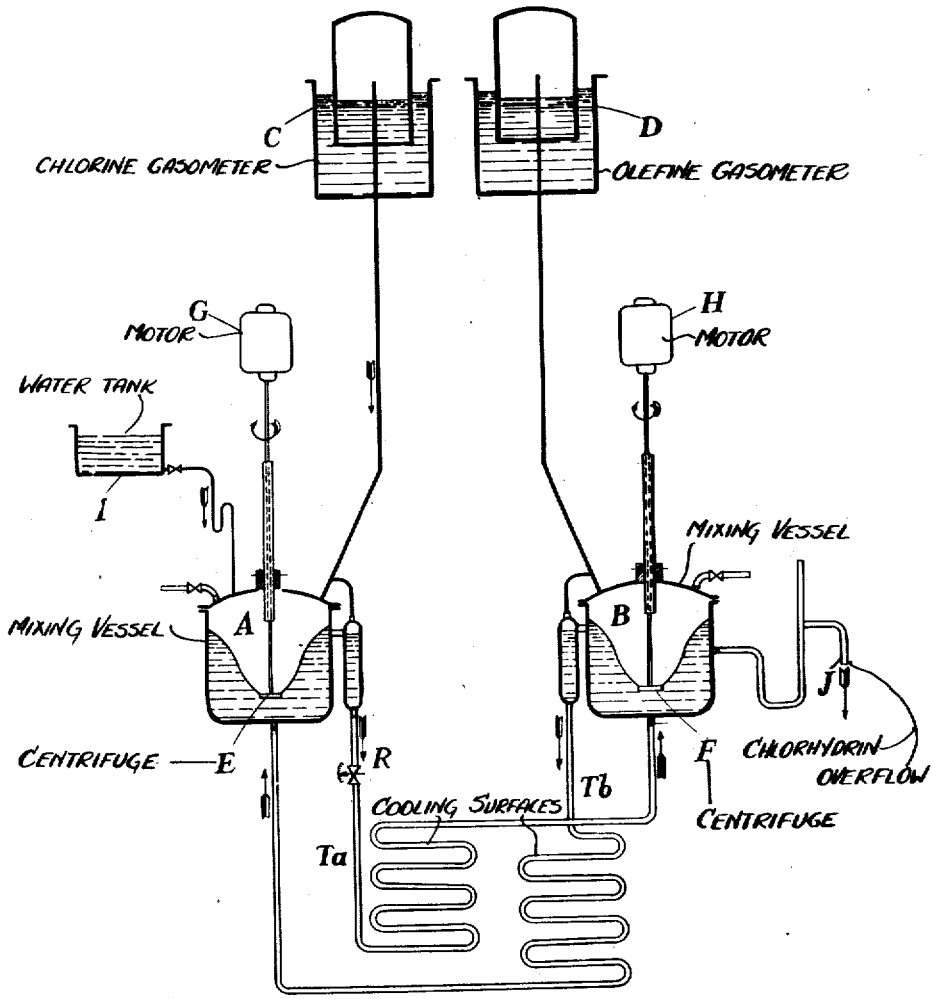
INVENTOR
H. M. Guinot
BY
C. F. Wanderoth
ATTORNEY Patented June 27, 1939

2,164,240

UNITED STATES PATENT OFFICE 2,164,240

MANUFACTURE OF CHLOROHYDRINS

Henri Martin Guinot, Niort, Deux-Sevres, France, assignor to Usines de Melle, Melle, France, a corporation of France Application February 26, 1936, Serial No. 65,915
In France March 6, 1935

3 Claims. (Cl. 260—634)

This invention relates to the manufacture of chlorohydrins. It is well known to produce chlorohydrins by the action of olefine hydrocarbons on aqueous solutions of hypochlorous acid, the latter being generally obtained by the hydrolysis of chlorine dissolved in water, in accordance with the reaction

$$Cl_2 + HOH \rightleftharpoons HOCl + HCl$$

However, when this method of working is employed, one is always more or less obliged to put up with the undesirable formation of the corresponding dichlorides, owing to the great affinity of chlorine for the olefine hydrocarbons treated. Finally, owing to the great ease with which chlorohydrins are saponified by the action of boiling water, it is difficult to remove them in the pure state from the aqueous solutions obtained as explained above without at the same time destroying a fairly large quantity of them by hydrolysis.

The present invention has for its object the provision of a process which will enable all the above mentioned difficulties to be overcome. It consists in effecting, simultaneously, in two distinct operating regions, on the one hand the solution of chlorine in water and, on the other hand the action of the olefine on the solution of hypochlorous acid thus obtained, and in ensuring, in each of these two operating regions, the absorption of the corresponding gas by means of a powerful agitation which is capable of causing at the same time a pressure reduction which produces a continuous circulation of liquid between the two regions. In this way the employment of the generally previously known circulating pumps and the trouble which such employment usually involves are avoided.

Another characteristic of the invention resides in the method of treatment of the resultant aqueous solution of chlorohydrin with a view to freeing it from the small quantity of dichloride that it may contain and extracting from it the chlorohydrin in a pure and anhydrous state. This method of treatment consists in first of all extracting the dichloride by means of a small quantity of a solvent which is only slightly soluble in water and which has only a slight affinity for the chlorohydrin itself. For this purification there may be used an extraction battery of a known type, for example, the one which has been described in French Patent Specifications No. 671,482 and No. 778,689. The solution of chlorohydrin thus purified is then treated in a second battery, which possesses a larger number of elements than the first, with a large volume of a solvent (or a mixture of solvents) which possesses an advantageous coefficient of extraction and is chosen so that it is possible to dehydrate the chlorohydrin easily by azeotropic distillation.

This method of treatment enables the disadvantages of the classic method to be avoided, according to which the solutions are distilled with a view to obtaining binary water-chlorohydrin mixtures, in the course of the distillation of which a fairly large quantity of chlorohydrin is lost by hydrolysis.

The accompanying drawing represents diagrammatically, in one of its embodiments, the apparatus for the manufacture of aqueous solutions of chlorohydrins.

The apparatus comprises essentially two vessels A and B which communicate with a chlorine gasometer C and an olefine gasometer respectively and which are connected together by pipes Ta and Tb that enable the liquid to circulate between the two vessels. These two vessels, constituting two separate operating regions, are preferably made of stoneware and are each provided with a centrifuge that rotates at a speed that is sufficient for the production, in the liquid, of a vortex with a suction cone which leaves the top face of the centrifuge uncovered. The centrifuges are denoted by E and F respectively and their driving motors by G and H respectively. In this way, the gas which constitutes the atmosphere of the vessel is sucked into the hollow cone of the vortex and forcibly emulsified in the liquid. On the other hand, the reduction of pressure produced in the liquid in the neighbourhood of the centrifuge in one vessel enables the liquid contained in the other vessel to be drawn by suction through the pipes Ta and Tb. Each pipe is connected to one vessel at a position high up where the liquid rises by centrifugal action and to the other vessel at a lower level. As these pipes are assumed normally to be charged with water, the regulation of the opening of the cock R, mounted in one of the pipes, ensures the desired rate of circulation between the two vessels being maintained.

It is to be noted that the pipes Ta and Tb are so disposed and of such length to offer a large surface of heat exchange, thus ensuring an intense cooling of the liquids in circulation, this being beneficial because the reaction under consideration is accompanied by an evolution of heat.

In order to start the apparatus, one of the vessels is connected with the chlorine gasometer C and the other with the gasometer D that is charged with the olefine to be treated. The centrifuges are caused to rotate and the opening of the cock R is regulated with a view to obtaining the optimum speed of circulation between the vessels A and B; an intense absorption of the two gases and the mixing of the liquid follows with the formation of chlorohydrin observed. As the gaseous chlorine reaches a state of perfect solution only in the vessel in which the olefine is absorbed, the production of the dichloride is very small. The vessels A and B do not require to be hermetically sealed; in particular, the shaft of the centrifuge does not have to be provided with a stuffing box but only with a greased guide, because the static pressure which exists in the vessel can be regulated so as to be as little different as possible from the atmospheric pressure.

The production of chlorohydrin can be made continuous by adding water continuously preferably into the chlorine vessel and producing its removal by overflowing from the other vessel. The water tank is denoted by I in the drawing, and the overflow for removing the solution of chlorohydrin is denoted by J.

Under these conditions, the yields of chlorohydrin in relation to the products treated are excellent—i. e., of the order of 90 to 95 per cent—if care is taken not to allow the temperature to rise above 15° to 20° C. However, the production of a small quantity of dichloride, which is found in solution along with the chlorohydrin, cannot be avoided, and the elimination of the dichloride and the separation of the chlorohydrin in the pure state are effected, as hereinbefore stated, in extraction batteries of known type which, for the sake of simplicity, have not been represented in the figure.

EXAMPLE I

*Manufacture of the chlorohydrin of ethylene glycol*

The stoneware vessels A and B each have a capacity of about 200 litres. The centrifuges, made of glass or special steel which is unattackable by the hydrochloric solutions treated, revolve at a speed which is sufficient to ensure a rate of about 10 cubic metres per hour for the liquid circulating between A and B. Under these conditions, 5 cubic metres of chlorine and ethylene per hour are absorbed in the two vessels respectively. It is even possible to double this speed of absorption if the increase of production of ethylene chloride which results therefrom is not considered to be undesirable.

In normal working, the vessel A is charged with 200 litres of water per hour, so that there overflows into B a solution containing about 1 gramme-molecule of chlorohydrin per litre.

The solution in vessel B is acid; it is exactly neutralised by milk of lime.

After filtration, the liquid is treated continuously in an extraction battery of four elements (see the aforesaid French Patent No. 671,482) with a fifth of its volume of a selected petroleum spirit boiling between very narrow temperature limits, for example, 105° to 110° C. The aqueous solution of chlorohydrin is, on leaving the battery, entirely free from the ethylene chloride which it held in solution. This product is subsequently separated from the extracting petroleum spirit by simple fractional distillation.

The aqueous solution of chlorohydrin that has thus been purified is treated continuously, in a second battery comprising twelve elements, with an equal volume of a mixture consisting of isopropyl ether 50 per cent, and normal propyl alcohol 50 per cent. This mixture has a coefficient of extraction of 1.6 for the chlorohydrin at a concentration of 8 per cent, so that, after passing through the battery, the extraction of chlorohydrin from the aqueous solution treated is complete.

The exhausted aqueous solution is then freed, by slight boiling, from the small quantity of solvents which it has dissolved and which is brought back into the circuit; as for the solution of chlorohydrin in the solvent, it is distilled in a column at the base of which pure chlorohydrin is collected whilst at the top a mixture of residual water and the solvents employed is obtained, this mixture being passed to decantation in accordance with the principles of azeotropic dehydration; according to these principles the refluxing to the column is ensured by the return of a sufficient fraction of the upper layer separated in the decanter, whilst the water and the mixture of solvents are withdrawn at the desired speed.

The pure chlorohydrin (B. P. 128 to 129° C.) is finally obtained with an excellent yield (92%), without taking into account the ethylene chloride (B. P. 83 to 84° C.) separated.

EXAMPLE 2

*Manufacture of the chlorohydrin of propylene glycol*

A normal aqueous solution of the chlorohydrin of propylene glycol is produced by working in the manner explained in the preceding example, with the sole difference that the gasometer which communicates with the vessel B contains propylene instead of ethylene.

After exact neutralisation by means of caustic soda, the resultant chlorohydrin solution is treated with a tenth of its volume of cyclohexane in a first extraction battery of any suitable type. This solvent used in such a small quantity has very little effect on the chlorohydrin itself but, on the other hand, is capable of extracting the whole of the propylene dichloride (B. P. 97.5° C.) which is then separated by distillation, the cyclohexane being continuously recovered as a first-fraction product (B. P. 80 to 81° C.)

The solution of chlorohydrin, which has thus been purified, is treated in a second battery with twice its volume of pure benzene which possesses a coefficient of extraction of 0.85 for the chlorohydrin of propylene glycol under these conditions of concentration.

Here again, the extracting agent serves to dehydrate the chlorohydrin by azeotropy on its subsequent separation by distillation. The chlorohydrin of propylene glycol (B. P. 125 to 127° C.) is obtained in the pure state at the base of the distillation column. The yield is 90 per cent calculated on the chlorine and propylene used.

These examples are not limitative and it is also pointed out that, without departing from the scope of the present invention, all these operations can be carried out under a pressure that differs from the ordinary pressure, either with a view to obtaining certain recoveries of heat during the distillation for example, or for the purpose of increasing the velocity of reaction during the first stage of the preparation of the aqueous solutions of chlorohydrin.

What I claim is:

1. Process for the continuous production of chlorohydrins by the action of olefines on aqueous solutions of chlorine in which the chlorine gas is dissolved in water in one region, and the resultant hypochlorous acid caused to react with the olefine in a separate region, comprising essentially interconnecting the separate regions to permit of intercirculation, emulsifying the liquid with the gas in both regions by means of centrifugal agitation, utilizing the suction effect of said agitation in each region to create intensive inter-circulation of liquid between the regions, regulating said circulation to ensure that the proportion of chlorine dissolved in unit volume of the liquid is extremely small and to realize substantially complete hydrolysis of the absorbed chlorine to hypochlorous acid, continuously withdrawing the resultant chlorohydrin solution from the second region and eliminating from the aqueous chlorohydrin solution the small quantity of dichloride therein by extracting with the aid of a small quantity of a solvent only slightly soluble in water and having only a slight affinity for the chlorohydrin itself.

2. Process for the continuous production of chlorohydrins by the action of olefines on aqueous solutions of chlorine in which the chlorine gas is dissolved in water in one region, and the resultant hypochlorous acid caused to react with the olefine in a separate region, comprising essentially interconnecting the separate regions to permit of intercirculation, emulsifying the liquid with the gas in both regions by means of centrifugal agitation, utilizing the suction effect of said agitation in each region to create intensive inter-circulation of liquid between the regions, regulating said circulation to ensure that the proportion of chlorine dissolved in unit volume of the liquid is extremely small and to realize substantially complete hydrolysis of the absorbed chlorine to hypochlorous acid, continuously withdrawing the resultant chlorohydrin solution from the second region and eliminating from the aqueous chlorohydrin solution the small quantity of dichloride therein by extraction with the aid of a small quantity of a solvent only slightly soluble in water and having only a slight affinity for the chlorohydrin itself, treating the dichloride-solvent body by distillation for recovery of the solvent, and returning the latter for re-use in the process.

3. Process for the continuous production of chlorohydrins by the action of olefines on aqueous solutions of chlorine in which the chlorine gas is dissolved in water in one region, and the resultant hypochlorous acid caused to react with the olefine in a separate region, comprising essentially interconnecting the separate regions to permit of inter-circulation, emulsifying the liquid with the gas in both regions by means of centrifugal agitation, utilizing the suction effect of said agitation in each region to create intensive inter-circulation of liquid between the regions, regulating said circulation to ensure that the proportion of chlorine dissolved in unit volume of the liquid is extremely small and to realize substantially complete hydrolysis of the absorbed chlorine to hypochlorous acid, continuously withdrawing the resultant chlorohydrin solution from the second region and eliminating from the aqueous chlorohydrin solution the small quantity of dichloride therein by extraction with the aid of a small quantity of a solvent only slightly soluble in water and having only a slight affinity for the chlorohydrin itself, separating the dichloride-solvent body from the purified aqueous chlorohydrins and finally extracting the chlorohydrin from its purified aqueous solution with a solvent which is capable of dehydrating the chlorohydrin by subsequent azeotropic distillation of the chlorohydrin-solvent extract.

HENRI MARTIN GUINOT.

CERTIFICATE OF CORRECTION.

Patent No. 2,164,240.     June 27, 1939.

HENRI MARTIN GUINOT.

It is hereby certified that the name of the assignee in the above numbered patent was erroneously described and specified as "USINES DE MELLE" whereas said name should have been described and specified as LES USINES DE MELLE, of Melle, France, a corporation of France, as shown by the record of assignments in this office; and that the said Letters Patent should be read with this correction therein that the same may conform to the record of the case in the Patent Office.

Signed and sealed this 29th day of August, A. D. 1939.

(Seal)

Leslie Frazer,
Acting Commissioner of Patents.

hypochlorous acid caused to react with the olefine in a separate region, comprising essentially interconnecting the separate regions to permit of intercirculation, emulsifying the liquid with the gas in both regions by means of centrifugal agitation, utilizing the suction effect of said agitation in each region to create intensive inter-circulation of liquid between the regions, regulating said circulation to ensure that the proportion of chlorine dissolved in unit volume of the liquid is extremely small and to realize substantially complete hydrolysis of the absorbed chlorine to hypochlorous acid, continuously withdrawing the resultant chlorohydrin solution from the second region and eliminating from the aqueous chlorohydrin solution the small quantity of dichloride therein by extracting with the aid of a small quantity of a solvent only slightly soluble in water and having only a slight affinity for the chlorohydrin itself.

2. Process for the continuous production of chlorohydrins by the action of olefines on aqueous solutions of chlorine in which the chlorine gas is dissolved in water in one region, and the resultant hypochlorous acid caused to react with the olefine in a separate region, comprising essentially interconnecting the separate regions to permit of intercirculation, emulsifying the liquid with the gas in both regions by means of centrifugal agitation, utilizing the suction effect of said agitation in each region to create intensive inter-circulation of liquid between the regions, regulating said circulation to ensure that the proportion of chlorine dissolved in unit volume of the liquid is extremely small and to realize substantially complete hydrolysis of the absorbed chlorine to hypochlorous acid, continuously withdrawing the resultant chlorohydrin solution from the second region and eliminating from the aqueous chlorohydrin solution the small quantity of dichloride therein by extraction with the aid of a small quantity of a solvent only slightly soluble in water and having only a slight affinity for the chlorohydrin itself, treating the dichloride-solvent body by distillation for recovery of the solvent, and returning the latter for re-use in the process.

3. Process for the continuous production of chlorohydrins by the action of olefines on aqueous solutions of chlorine in which the chlorine gas is dissolved in water in one region, and the resultant hypochlorous acid caused to react with the olefine in a separate region, comprising essentially interconnecting the separate regions to permit of inter-circulation, emulsifying the liquid with the gas in both regions by means of centrifugal agitation, utilizing the suction effect of said agitation in each region to create intensive inter-circulation of liquid between the regions, regulating said circulation to ensure that the proportion of chlorine dissolved in unit volume of the liquid is extremely small and to realize substantially complete hydrolysis of the absorbed chlorine to hypochlorous acid, continuously withdrawing the resultant chlorohydrin solution from the second region and eliminating from the aqueous chlorohydrin solution the small quantity of dichloride therein by extraction with the aid of a small quantity of a solvent only slightly soluble in water and having only a slight affinity for the chlorohydrin itself, separating the dichloride-solvent body from the purified aqueous chlorohydrins and finally extracting the chlorohydrin from its purified aqueous solution with a solvent which is capable of dehydrating the chlorohydrin by subsequent azeotropic distillation of the chlorohydrin-solvent extract.

HENRI MARTIN GUINOT.

CERTIFICATE OF CORRECTION.

Patent No. 2,164,240.            June 27, 1939.

HENRI MARTIN GUINOT.

It is hereby certified that the name of the assignee in the above numbered patent was erroneously described and specified as "USINES DE MELLE" whereas said name should have been described and specified as LES USINES DE MELLE, of Melle, France, a corporation of France, as shown by the record of assignments in this office; and that the said Letters Patent should be read with this correction therein that the same may conform to the record of the case in the Patent Office.

Signed and sealed this 29th day of August, A. D. 1939.

(Seal)                                          Leslie Frazer,
                                            Acting Commissioner of Patents.